United States Patent
Tidke et al.

(10) Patent No.: US 11,520,671 B2
(45) Date of Patent: Dec. 6, 2022

(54) FAST MULTIPATH FAILOVER

(71) Applicant: EMC IP Holding Company LLC, Hopkinton, MA (US)

(72) Inventors: Ashwin Tidke, Pune (IN); Venkatesh Doddamane Nagaraj, Bangalore (IN); Kurumurthy Gokam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 233 days.

(21) Appl. No.: 16/775,892

(22) Filed: Jan. 29, 2020

(65) Prior Publication Data

US 2021/0232468 A1 Jul. 29, 2021

(51) Int. Cl.
| G06F 11/00 | (2006.01) |
| G06F 11/20 | (2006.01) |
| G06F 11/07 | (2006.01) |
| G06F 3/06 | (2006.01) |

(52) U.S. Cl.
CPC .......... *G06F 11/2023* (2013.01); *G06F 3/067* (2013.01); *G06F 3/0619* (2013.01); *G06F 3/0653* (2013.01); *G06F 3/0659* (2013.01); *G06F 11/0757* (2013.01)

(58) Field of Classification Search
CPC ............. G06F 11/2023; G06F 11/0757; G06F 11/2002; G06F 11/2007; G06F 11/201; G06F 3/0619; G06F 3/0653; G06F 3/0659; H04L 12/40176; H04L 45/28
See application file for complete search history.

(56) References Cited

U.S. PATENT DOCUMENTS

| 6,567,397 | B1 | 5/2003 | Campana et al. |
| 6,687,746 | B1 | 2/2004 | Shuster et al. |
| 6,697,875 | B1 | 2/2004 | Wilson |
| 7,275,103 | B1 | 9/2007 | Thrasher et al. |
| 7,454,437 | B1 | 11/2008 | Lavallee et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Philip Guyton
(74) *Attorney, Agent, or Firm* — Ryan, Mason & Lewis, LLP (57) ABSTRACT

A host device is configured to obtain a default timeout value of the host device for the submission of an input-output (IO) operation to a storage system and to determine a first timeout value that is less than the default timeout value. The host device is further configured to submit the IO operation to the storage system along a first path using the first timeout value and to determine that the submission of the IO operation along the first path has timed out. The host device is further configured to determine a second timeout value that is greater than the first timeout value and to submit the IO operation to the storage system along a second path using the second timeout value.

20 Claims, 3 Drawing Sheets

(56) References Cited

U.S. PATENT DOCUMENTS

| | | |
|---|---|---|
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,400,611 B1 | 7/2016 | Raizen |
| 9,594,780 B1 | 3/2017 | Esposito et al. |
| 9,647,933 B1 | 5/2017 | Tawri et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,639 B2 | 12/2019 | Mallick et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2013/0117766 A1 | 5/2013 | Bax et al. |
| 2014/0105068 A1 | 4/2014 | Xu |
| 2014/0173144 A1* | 6/2014 | Kobashi ............ G06F 3/061 710/38 |
| 2015/0222705 A1 | 8/2015 | Stephens |
| 2015/0242134 A1 | 8/2015 | Takada et al. |
| 2016/0073315 A1* | 3/2016 | Kai ............ H04L 47/24 370/225 |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2021/0232468 A1* | 7/2021 | Tidke ............ G06F 3/0653 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

U.S. Appl. No. 15/795,653 filed in the name of Maneesh Pusalkar et al. Oct. 27, 2017, and entitled "Storage System with Network-Wide Configurable Device Names."

U.S. Appl. No. 16/142,274 filed in the name of Sanjib Mallick et al. Sep. 26, 2018, and entitled "Host Device with Multi-Path Layer Implementing Automatic Standby Setting for Active-Active Configuration."

U.S. Appl. No. 16/145,502 filed in the name of Vinay G. Rao et al. Sep. 28, 2018, and entitled "Host Device with Multi-Path Layer Implementing Path Selection Based At Least In Part on Fabric Identifiers."

U.S. Appl. No. 16/155,491 filed in the name of Kundan Kumar et al. Oct. 9, 2018, and entitled "Migrating Control of a Multi-Path Logical Device from a Current MPIO Driver to a Target MPIO Driver."

U.S. Appl. No. 16/155,429 filed in the name of Rimpesh Patel et al. Oct. 9, 2018, and entitled "Categorizing Host IO Load Pattern and Communicating Categorization to Storage System."

U.S. Appl. No. 16/697,393 filed in the name of Vinay G. Rao et al. Nov. 27, 2019, and entitled "Automated Seamless Migration of Logical Storage Devices."

U.S. Appl. No. 16/710,828 filed in the name of Amit Pundalik Anchi et al. Dec. 11, 2019, and entitled "Automated Seamless Migration with Signature Issue Resolution."

* cited by examiner

FAST MULTIPATH FAILOVER

FIELD

The field relates generally to information processing systems, and more particularly to storage in information processing systems.

BACKGROUND

Storage arrays and other types of storage systems are often shared by multiple host devices over a network. A given host device may comprise a multipath input-output (MPIO) driver that is configured to process input-output (IO) operations for delivery from the host device to the storage system. MPIO drivers often group all of the paths between a host device and a given logical volume of a storage system into a logical device, also known as a multipath device. Multipath devices are utilized by the MPIO drivers of a host device to distribute IO operations across all available paths to a given logical volume. MPIO drivers often rely on default operation system (OS) IO timeout values defined by various components within the operating system of the host device to determine when an IO operation that is submitted to the storage system has timed out.

SUMMARY

In one embodiment, an apparatus comprises a host device comprising a processor coupled to memory. The host device is configured to obtain a default timeout value of the host device for the submission of an input-output operation to a storage system and to determine a first timeout value that is less than the default timeout value. The host device is further configured to submit the input-output operation to the storage system along a first path using the first timeout value and to determine that the submission of the input-output operation along the first path has timed out based at least in part on the first timeout value. The host device is further configured to determine a second timeout value that is greater than the first timeout value and to submit the input-output operation to the storage system along a second path using the second timeout value based at least in part on the determination that the submission of the input-output operation along the first path has timed out.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
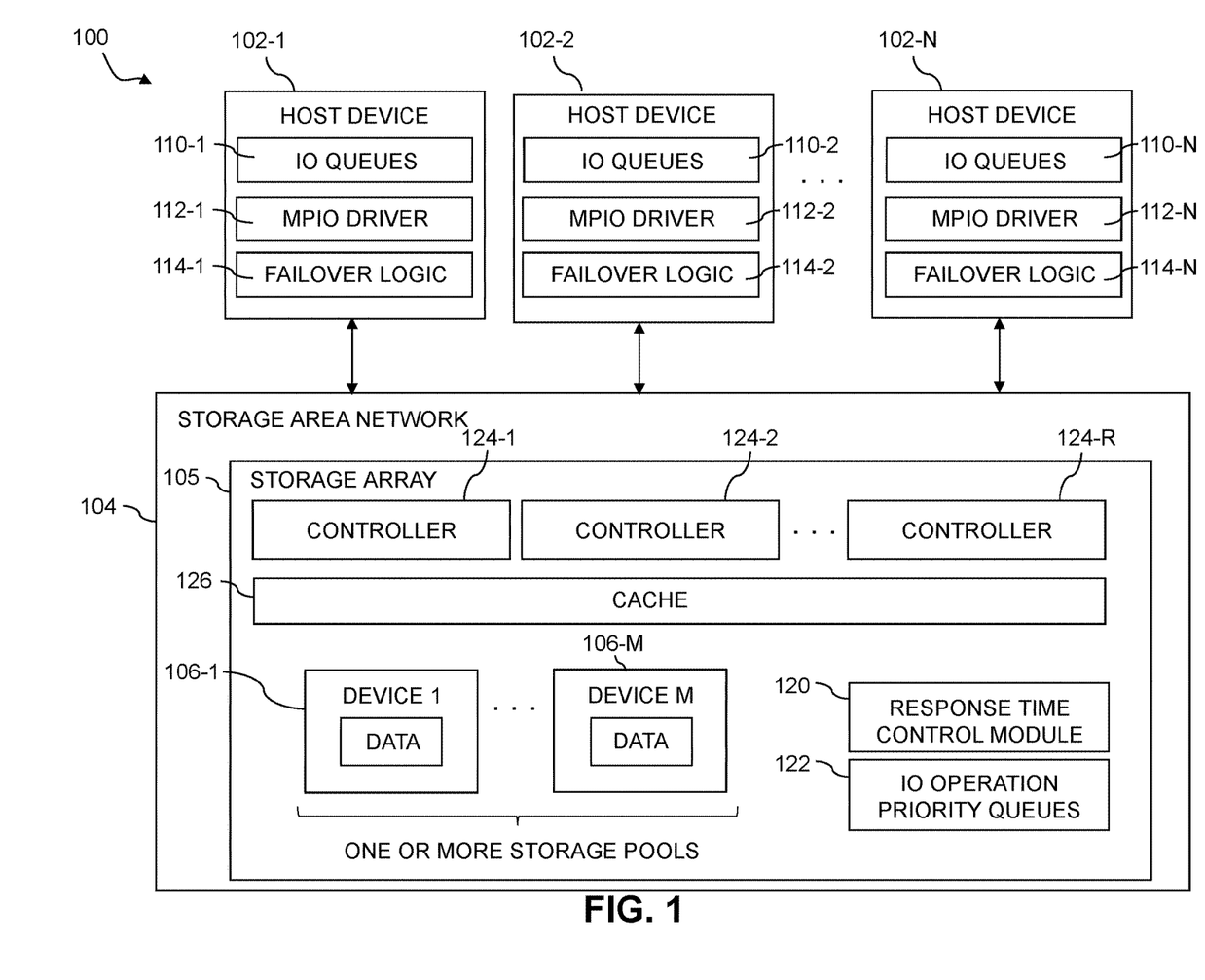
FIG. 1 is a block diagram of an information processing system configured with functionality for fast multipath failover in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102 and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical volumes such as, e.g., logical units (LUNs), that are configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise Small Computer System Interface (SCSI) commands or non-volatile memory express (NVMe) commands, although other types of commands can be used in other embodiments. A given IO operation, as that term is broadly used herein, illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths. In illustrative embodiments, with reference also to the example of FIG. 2, each of the host devices 102 comprises one or more hardware bus adapter (HBA) ports 200, e.g., HBA ports 200-1 and 200-2 in the example of FIG. 2, which are utilized to communicate with the storage array 105 via the SAN 104. In some embodiments, the HBA ports 200 are referred to as initiators for the IO paths. For example, the HBA port 200-1 of host device 102-1 may be referred to as initiator 1 (I1) and the HBA port 200-2 of host device 102-1 may be referred to as initiator 2 (I2). HBA ports 200 may comprise any circuitry that is configured to enable communication between the host devices 102 and the storage array 105 or any other devices.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," which issued as U.S. Pat. No. 10,474,367 on Nov. 12, 2019, the entirety of which is incorporated by reference herein.

Storage array 105 also comprises a plurality of controllers 124-1, 124-2, . . . 124-R and a cache 126. In some embodiments, storage array 105 may comprise one controller 124, two controllers 124 or any other number of controllers 124. In illustrative embodiments, controllers 124 comprise processing devices, memory, or other circuitry that may be used to service input-output operations that are received from the host devices 102. While controllers 124 may be described as comprising particular configurations herein, controllers 124 are not limited to the disclosed embodiments and may comprise any other configuration of electrical and software components that may be utilized to service input-output operations that are received from host devices 102 by storage array 105. With reference also to the example of FIG. 2, in some embodiments, each of the controllers 124 comprises one or more ports 202, which are utilized to communicate with the host devices 102 via the SAN 104.

Figure 2:
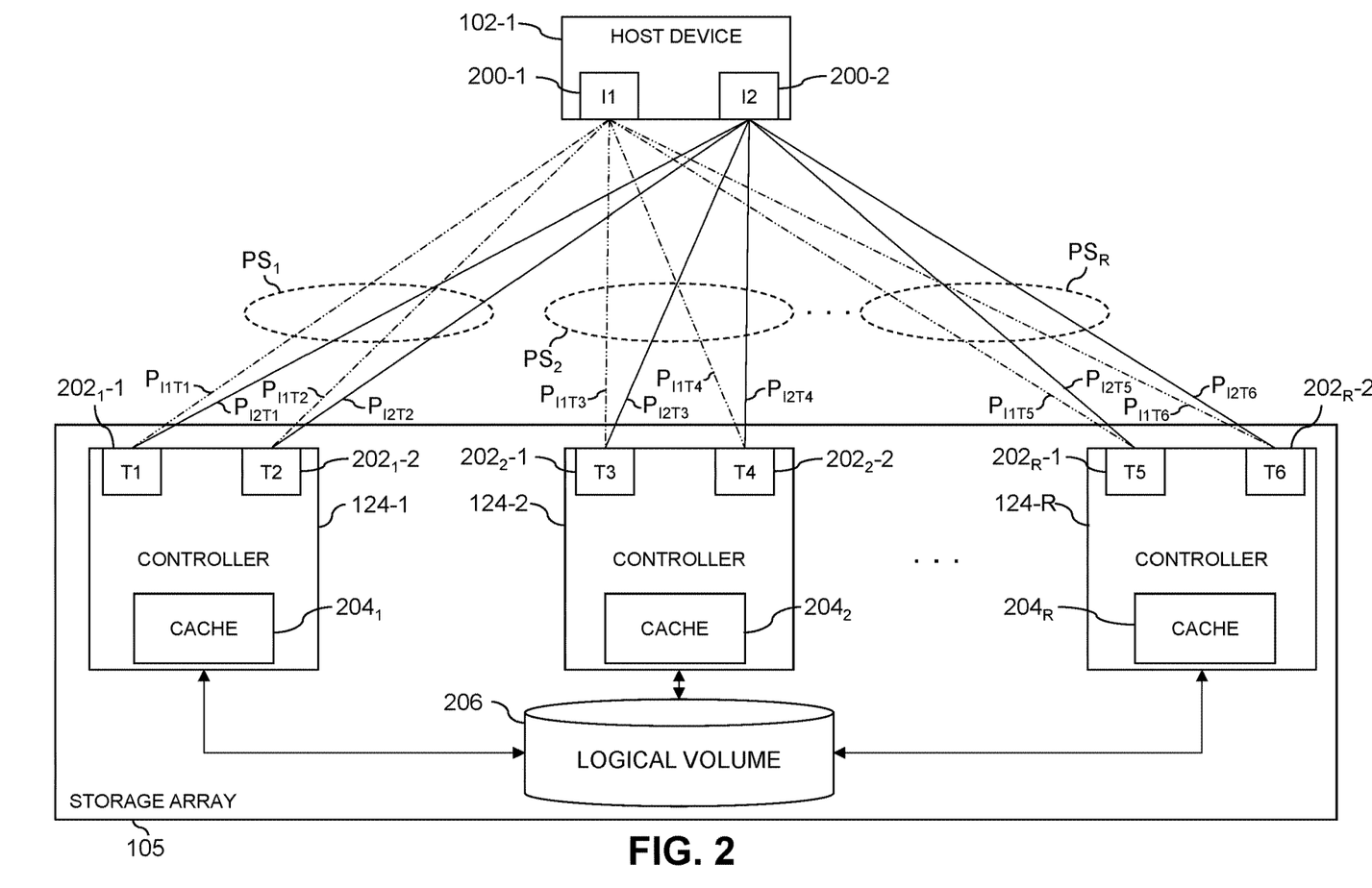
FIG. 2 is a block diagram illustrating paths between a host device and controllers of the information processing system of FIG. 1 in an illustrative embodiment.

In the example shown in FIG. 2, controller 124-1 comprises ports $202_1$-1 and $202_1$-2, controller 124-2 comprises ports $202_2$-1 and $202_2$-2, . . . and controller 124-R comprises ports $202_R$-1 and $202_R$-2. In some embodiments, the ports 202 are referred to as targets for the IO paths. For example, in the illustrated example, the ports $202_1$-1 and $202_1$-2 of controller 124-1 may be referred to as targets 1 (T1) and 2 (T2) respectively, the ports $202_2$-1 and $202_2$-2 of controller 124-2 may be referred to as targets 3 (T3) and 4 (T4) respectively, and the ports $202_R$-1 and $202_R$-2 of controller 124-R may be referred to as targets 5 (T5) and 6 (T6) respectively.

The cache 204 of each of the controllers 124 comprise one or more memory devices such as, e.g., random access memory (RAM), read-only memory (ROM), flash memory or other types of memory, in any combination.

In some embodiments, cache 126 is a global cache that is separate from and accessible by all of the controllers 124. Cache 126 may comprise one or more memory devices such as, e.g., random access memory (RAM), read-only memory (ROM), flash memory or other types of memory, in any combination. In some embodiments, the caches 204 of one or more of the controllers 124 may together comprise some or all of cache 126.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as VNX®, VMAX®, Unity™ or PowerMax™ storage arrays, commercially available from Dell EMC.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

The host devices 102 comprise respective sets of IO queues 110-1, 110-2, . . . 110-N and respective MPIO drivers 112-1, 112-2, . . . 112-N. The MPIO drivers 112 collectively comprise a multipath layer of the host devices 102. The respective host devices 102 comprise functionality for failover logic 114-1, 114-2, . . . 114-N. The failover logic 114 may be implemented as part of the MPIO drivers 112 of the respective host devices 102 or separate from the MPIO drivers 112.

MPIO drivers typically group all paths from a host device to a logical volume, such as a LUN, into a single logical device known as a multipath device. The individual block devices representing each path are known as native devices. Applications use a multipath device for IO operations so that the IO operations may be distributed across all available paths. When paths fail or timeout, the MPIO driver will typically redirect the IO operations to other alive paths in the multipath device.

The MPIO drivers described herein may comprise, for example, otherwise conventional MPIO drivers, such as PowerPath® drivers from Dell EMC, suitably modified in the manner disclosed herein to provide functionality for fast multipath failover. Other types of MPIO drivers from other driver vendors may be suitably modified to incorporate functionality for fast multipath failover as disclosed herein.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers of the multipath layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

With reference again to the example of FIG. 2, host device 102-1 comprises a multipath device that includes a plurality of paths P between the host device 102-1 and a logical volume 206 of the storage array 105. Each path P comprises an initiator and a target. For example, a path $P_{I1T1}$ from host device 102-1 to the logical volume 206 comprises initiator I1 (i.e., HBA port 200-1 of host device 102-1) and target T1 (i.e. port $202_1$-1 of controller 124-1). Paths $P_{I2T1}$, $P_{I1T2}$, $P_{I2T2}$, $P_{I1T3}$, $P_{I2T3}$, $P_{I1T4}$, $P_{I2T4}$, $P_{I1T5}$, $P_{I2T5}$, $P_{I1T6}$ and $P_{I2T6}$ similarly comprise respective initiators and targets as illustrated. The paths P of the multipath device that utilize the same controller 124-1 may also be grouped together as path sets PS. As illustrated in FIG. 2, for example, paths $P_{I1T1}$, $P_{I2T1}$, $P_{I1T2}$ and $P_{I2T2}$ utilize controller 124-1 and are grouped together into a path set $PS_1$; paths $P_{I1T3}$, $P_{I2T3}$, $P_{I1T4}$ and $P_{I2T4}$ utilize controller 124-2 and are grouped together into a path set $PS_2$; and paths $P_{I1T5}$, $P_{I2T5}$, $P_{I1T6}$ and $P_{I2T6}$ utilize controller 124-R and are grouped together into a path set $PS_R$.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

Class drivers often impose a certain IO timeout value on every IO operation to the devices of that class. In the case of an unresponsive target device, the class driver IO timeout value is the minimum duration for which an IO operation does not return from the hardware bus adapter (HBA) layer with a definitive status. Until the IO operation times out, components in the IO stack, including MPIO drivers, class drivers and the application submitting the IO operation request itself, will not be aware of or be able to respond to the failure. On some operating systems, HBA vendors can also configure IO timeout values, after which their respective HBAs report a timeout of an IO operation.

If the IO timeout value is too large, it can make the application, or the system itself, unresponsive. If the IO timeout value is too small, it can cause unintentional or unnecessary IO operation failures on a single path device or a multipath device in a SAN that may be facing some temporary latency or other issues on all paths. These IO timeout values are typically tuned to ensure that they can sustain all types of devices that are connected to a host device including locally attached single path devices and devices residing on a storage system connected to the host device via multiple paths via a network.

MPIO drivers typically rely on the IO timeout values defined by various components of the OS or HBA vendors, also referred to herein as OS IO timeout values or default OS IO timeout values, when determining whether or not a communication has been successful. Although the OS IO timeout values may be user configurable at the OS level, these OS IO timeout values are not application or device specific and instead generally apply to all communications being performed by the OS. Since these OS IO timeout values may also be used for a single path system or locally attached storage devices, they are often set to a conservatively large value for small IO operations, e.g., 60 seconds (s) or other large values. Typical MPIO drivers, despite having access to multiple paths on which to retry the IO operation in response to a timeout, also referred to herein as failover, still rely on this OS IO timeout value for each IO operation attempt, thus unnecessarily delaying failover to healthier paths.

Failover logic 114 is configured with functionality for intelligently varying the IO timeout values used by the MPIO drivers 112, if necessary, for each retry attempt of an IO operation. Failover logic 114 allows the MPIO drivers 112 to failover the IO operations quickly to healthy, alternative working paths, while also avoiding the possibility of premature IO operation failures in a slow storage SAN, which is also referred to herein as fast multipath failover. The use of the term fast in fast multipath failover is not meant to be limited to any particular speed and instead is meant to indicate that the failover of IO operations to new paths takes less time than that which would occur using default OS IO timeout values, thereby increasing the potential efficiency of the storage system. The failover logic 114 functionality leverages knowledge of failover algorithms to decide on an IO timeout value for each retry attempt of an IO operation.

The failover logic 114 allows the MPIO driver 112 to override the conservatively large IO timeout values that are set at the OS level with IO timeout values more suited to a storage system having multiple paths to the logical volumes. This allows the MPIO driver 112 to provide faster failover of failed IO operations while also avoiding the risk of premature IO failures in slower, possibly congested, SANs.

Illustrative embodiments of the techniques and functionality of failover logic 114 will now be described in more detail with reference to the example process shown in the flow diagram of FIG. 3.

Figure 3:
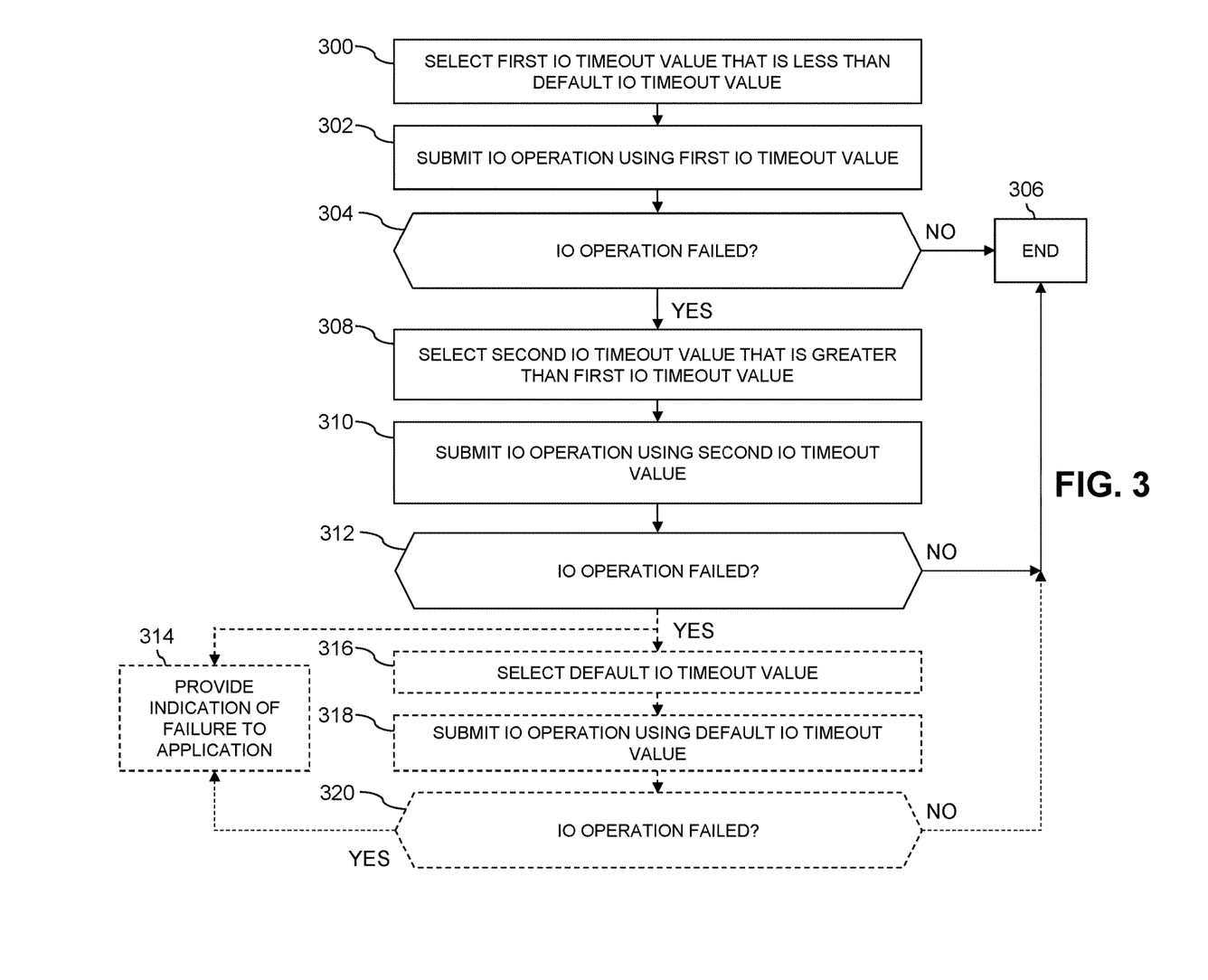
FIG. 3 is a flow diagram of an example failover process in an illustrative embodiment.

The process as shown in FIG. 3 includes steps 300 through 320 and is suitable for use in the system 100 but is more generally applicable to other types of systems comprising multiple host devices and a shared storage system. The process will be described with reference also to FIGS. 1 and 2.

At step 300, failover logic 114 selects a first IO timeout value that is less than the default OS IO timeout value. The default OS IO timeout value may be specified as part of or in conjunction with an IO operation selected by the MPIO driver for submission to the storage system. The first IO timeout value may be selected for a first number of attempts. In some embodiments, the first IO timeout value may comprise a value that is substantially less than the default OS IO timeout value. For example, the first IO timeout value may comprise a value that is less than three quarters of the default OS IO timeout value, less than half of the default OS IO timeout value, less than one quarter of the default OS IO timeout value, less than one tenth of the default OS IO timeout value, or less than any other portion of the IO timeout value. In one example scenario, the default OS IO timeout value may be, e.g., 60 s, and failover logic 114 may select the first IO timeout value as, e.g., 10 s, for the submission of the IO operation.

In some embodiments the first number of attempts may comprise one attempt, two attempts or any other number of attempts. In cases where a multipath device has two or fewer alive paths, the first number of attempts that use the first IO timeout value may be further limited to a smaller number of attempts than a multipath device having more than two paths. For example, the first number of attempts may be limited to one attempt for each path in this example scenario.

In some cases, failover logic 114 may select the IO timeout value separately for each attempt or for a set of attempts. For example, an initial attempt or set of attempts may have the first IO timeout value selected, a subsequent attempt or set of attempts may have a second IO timeout value selected that is different than the first IO timeout value, and so on. In an illustrative embodiment, the IO timeout value selected for each subsequent attempt or set of attempts may be greater than the IO timeout value selected for a prior attempt or set of attempts. In an illustrative embodiment, the IO timeout value selected for a subsequent attempt or set of attempts may be greater than the IO timeout value selected for a prior attempt, but less than or equal to the default OS IO timeout value.

At step 302, the MPIO driver 112 submits an IO operation using the first IO timeout value. For example, the MPIO driver 112 may modify or replace the default OS IO timeout value, which was specified as part of or in conjunction with the IO operation received from an application, with the first IO timeout value. In some embodiments, the MPIO driver 112 may submit the IO operation using the first IO timeout value for the first number of attempts in the event that any of the attempts fail, for example due to a timeout based at least in part on the first IO timeout value.

At step 304, the MPIO driver 112 determines whether or not the submitted IO operation has failed, for example, based at least in part on the first IO timeout value. For example, if the MPIO driver 112 does not receive an indication that the IO operation was successful within the period of time defined by the first IO timeout value, the MPIO driver 112 may determine that the IO operation has failed.

In some cases, the MPIO driver 112 may determine that the IO operation has failed based at least in part on the IO operation timing out on the first number of attempts based at least in part on the first IO timeout value.

If the MPIO driver 112 determines that the submitted IO operation has not failed, e.g., the MPIO driver 112 receives an indication that the submitted IO operation was successful, the process proceeds to step 306 and ends. If the MPIO driver 112 determines that the IO operation has failed, e.g., does not receive an indication that the IO operation was successful within the period of time defined by the first IO timeout value, the process proceeds to step 308.

At step 308, failover logic 114 selects a second IO timeout value that is greater than the first IO timeout value based at least in part on the determination that the IO operation failed at step 304. In some embodiments, the second IO timeout value is less than or equal to the default OS IO timeout value. In some embodiments, the second IO timeout value is equal to the default OS IO timeout value. In some embodiments, the second IO timeout value may be greater than the default OS IO timeout value.

The second IO timeout value may be selected for a second number of attempts. In some embodiments the second number of attempts may comprise one attempt, two attempts or any other number of attempts. In some embodiments, where a multipath device has two or fewer alive paths, the second number of attempts that use the second IO timeout value may be further limited to a smaller number of attempts than a multipath device having more than two paths. For example, the second number of attempts may be limited to one attempt for each path in this example scenario.

At step 310, the MPIO driver 112 submits the IO operation using the second IO timeout value. In some embodiments, the MPIO driver 112 may submit the IO operation using the second IO timeout value for the second number of attempts in the event that any of the attempts fail, for example due to a timeout based at least in part on the second IO timeout value.

At step 312, the MPIO driver 112 determines whether or not the submitted IO operation has failed, for example, based at least in part on the second IO timeout value. For example, if the MPIO driver 112 does not receive an indication that the IO operation was successful within the period of time defined by the second IO timeout value, the MPIO driver 112 may determine that the IO operation has failed.

In some cases, the MPIO driver 112 may determine that the IO operation has failed based at least in part on the IO operation timing out on the second number of attempts based at least in part on the second IO timeout value.

If the MPIO driver 112 determines that the submitted IO operation has not failed at step 312, e.g., the MPIO driver 112 receives an indication that the submitted IO operation was successful, the process proceeds to step 306 and ends.

Hashed lines are utilized to indicate that steps 314-320 are optionally or alternatively performed in some embodiments.

For example, in the case that the second IO timeout value is equal to the default OS IO timeout value and the MPIO driver 112 determines that the IO operation has failed at step 312, e.g., does not receive an indication that the IO operation was successful within the period of time defined by the second IO timeout value, the process may proceed to step 314 and the MPIO driver 112 may take any appropriate action for a failed IO operation such as, e.g., providing an indication of the failure of the IO operation to the application.

Alternatively, in the case that the second IO timeout value is less than the default OS IO timeout value and the MPIO driver 112 determines that the IO operation has failed at step 312, e.g., does not receive an indication that the IO operation was successful within the period of time defined by the second IO timeout value, the process proceeds to step 316.

At step 316, failover logic 114 selects the default OS IO timeout value based at least in part on the determination that the IO operation failed at step 312.

The default OS IO timeout value may be selected for a third number of attempts. In some embodiments the third number of attempts may comprise one attempt, two attempts or any other number of attempts. In cases where a multipath device has two or fewer alive paths, the third number of attempts that use the default OS IO timeout value may be further limited to a smaller number of attempts than a multipath device having more than two paths. For example, the third number of attempts may be limited to one attempt for each path in this example scenario. In some embodiments, the default OS IO timeout value may be selected for all subsequent attempts or until an attempt is successful, after which failover logic 114 may once again select an IO timeout value that is less than the default OS IO timeout value, e.g., the first IO timeout value, the second IO timeout value or any other IO timeout value.

At step 318, the MPIO driver 112 submits the IO operation using the default OS IO timeout value. In some embodiments, the MPIO driver 112 may submit the IO operation using the default OS IO timeout value for the third number of attempts in the event that any of the attempts fail, for example due to a timeout based at least in part on the default OS IO timeout value.

At step 320, the MPIO driver 112 determines whether or not the submitted IO operation has failed, for example, based at least in part on the default OS IO timeout value. For example, if the MPIO driver 112 does not receive an indication that the IO operation was successful within the period of time defined by the default OS IO timeout value, the MPIO driver 112 may determine that the IO operation has failed.

In some cases, the MPIO driver 112 may determine that the IO operation has failed based at least in part on the IO operation timing out on the third number of attempts based at least in part on the default OS IO timeout value.

If the MPIO driver 112 determines that the submitted IO operation has not failed at step 320, e.g., the MPIO driver 112 receives an indication that the submitted IO operation was successful, the process proceeds to step 306 and ends.

If the MPIO driver 112 determines that the IO operation has failed at step 320, e.g., does not receive an indication that the IO operation was successful within the period of time defined by the default OS IO timeout value, the process may proceed to step 314 and the MPIO driver 112 may take any appropriate action for a failed IO operation such as, e.g., providing an indication of the failure of the IO operation to the application.

In some cases, the final attempt using the default OS IO timeout value may be made on the original path that first failed using the first IO timeout value. This final attempt may be referred to as an extra try.

Separate instances of the FIG. 3 process may be performed in respective additional host devices that share the storage array.

The particular processing operations and other system functionality described in conjunction with the flow diagram of FIG. 3 are presented by way of illustrative example only, and should not be construed as limiting the scope of the disclosure in any way. Alternative embodiments can use other types of processing operations involving host devices, storage systems and logics. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different failover logic arrangements within a given information processing system.

Functionality such as that described in conjunction with the flow diagram of FIG. 3 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

In one example scenario, the first number of attempts may comprise two attempts based at least in part on the following example assumptions and facts. For example, in order to avoid a scenario where there is a single point of failures, a SAN storage device is connected to a host device via at least four paths. A multipath driver typically performs a second attempt, i.e., the first retry, on a path that is physically farthest from that used for the first, failed, attempt.

For example, if the path selected for the first attempt utilizes a first I_T nexus, which comprises a first HBA port of the host device, a first network link such as, e.g., a router or other network link, and a first port on a controller of the storage system, the path selected for the second attempt may utilize a second I_T nexus, which comprises a second HBA port of the host device, a second network link and a second port on the controller of the storage system, such that the first and second attempts are routed through two physically distinct paths. For example, with reference also to FIG. 2, if the first attempt utilizes path $P_{I1T1}$, which comprises HBA port 200-1 (I1) of the host device 102-1 and port $202_{1-1}$ (T1) of the controller 124-1, the MPIO driver will likely try the second attempt using a physically distinct path such as, e.g., path $P_{I2T6}$, which comprises HBA port 200-2 (I2) of the host device 102-1 and port $202_{R-2}$ (T6) of the controller 124-R.

If the first number of attempts at the first IO timeout value fail while using these physically distinct paths, e.g., both the first and second attempts in this example scenario, there is a possibility that either the target storage device or the entire SAN is experiencing increased latency issues or other failures. The failover logic 114 then selects a larger IO timeout value or even the default IO timeout value for further attempts to determine whether the failure is related to a latency issue or a failure of the SAN or storage device.

In most scenarios, where a single I_T nexus is facing a connectivity or latency issue, the first failover to a physically distinct path which utilizes a second, physically distinct, I_T nexus will often be successful and provide very fast failover due to the low IO timeout values selected by the failover logic 114 for the first number of attempts. Such very fast failover improves the efficiency of the storage system and reduces latency that would have otherwise been induced into the storage system by use of the larger default OS IO timeout value.

In some cases, the IO timeout value selected by failover logic 114 for a given attempt or number of attempts may be calculated by failover logic 114 as a variable IO timeout value based at least in part on numerous factors associated with the storage system. Such factors may comprise, for example, the number of attempts, recent latency observed on the various paths, the size of the IO operation, recently observed timeouts in the storage system by this host device or other host devices, the number of alive paths, or any other factors that may be determined based on a status of some or all of the components of the storage system.

In an example scenario, where the MPIO driver 112 is aware of the number of paths and the failover times of each volume, failover logic 114 may determine a more optimal value per volume in case of a failure. MPIO drivers 112 typically keep track of a latency per path and per volume for choosing paths on which to dispatch IO operations. These latency values may be utilized by the failover logic 114 for computing the initial variable IO timeout value. In addition, the number of retry counts may also be utilized by the failover logic 114 to adjust the initial variable timeout value. As an example, the initial IO timeout value for a given path may be equal to the average latency observed per IO operation on a given volume corresponding to that given path as shown in equation (1) below:

$$\text{initial IO timeout value} = \text{average latency of volume observed per IO operation} \tag{1}$$

The initial IO timeout value may be set as a current IO timeout value.

In this example scenario, the default OS IO timeout value may be equal to a disk class timeout value for the OS, also referred to herein as the default OS IO timeout value, as shown in equation (2) below:

$$\text{default OS IO timeout value} = \text{disk class timeout value for OS} \tag{2}$$

The amount to increase the current IO timeout value for a subsequent failover attempt may then be determined according to equation (3) below:

$$\text{timeout value increase} = \frac{\text{default } OS \text{ } IO \text{ timeout value} - \text{current } IO \text{ timeout value}}{\text{total number of retries}} \tag{3}$$

In some embodiments, the total number of retries may be predetermined, e.g., set at startup, on reboot, or at any other time. In some embodiments, the total number of retries may be set or configured by a user.

The timeout value increase is added to the current IO timeout value to determine a new current IO timeout value for use in a subsequent attempt, as shown in equation (4) below:

$$\text{current IO timeout value} = \text{current IO timeout value} + \text{timeout value increase} \tag{4}$$

The process may then iterate through equations 3 and 4 as needed until the current IO timeout value is equal to the default OS IO timeout value or any path failures have been resolved.

In a case where the MPIO driver 112 is not able to obtain the average latency value of the volume, the initial IO timeout value may be set to the disk class timeout value, e.g., the default OS IO timeout value. In this case, no iterative increase of the current IO timeout value may be necessary for subsequent attempts since the current IO timeout value will be equal to the default OS IO timeout value in the first iteration.

In some cases, failover logic 114 may be configured with one or more preset IO timeout values which may be utilized for particular components of the storage system. For example, failover logic 114 may be configured with one or more predetermined IO timeout values for use with particular storage devices, particular storage device types, particular applications requesting the IO operations, or any other component of the storage system. For example, failover logic 114 may utilize one preset IO timeout value for a first storage device or storage device type and another preset IO timeout value for a second storage device or storage device type. Likewise, failover logic 114 may utilize one preset IO timeout value for IO operations issued by a first application and another preset IO timeout value for IO operations issued by a second application. This functionality allows failover logic 114 to tailor the IO timeout values to the particular components of the host device and storage system that are being utilized to process IO operations. These preset IO timeout values may be utilized by failover logic 114 as the selected IO timeout value for the first number of attempts, second number of attempts or for any other attempts.

The above-described functions associated with functionality for fast multipath failover are carried out at least in part under the control of its failover logic 114. For example, failover logic 114 is illustratively configured to control performance of portions of the processes shown in the flow diagram described above in conjunction with FIG. 3.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support fast multipath failover.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with non-volatile memory express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeOF.

As indicated previously, absent use of functionality for fast multipath failover as disclosed herein, path failovers will typically utilize the default OS IO timeout failover values which are often set at a large value to accommodate a variety of use cases. This leads to inefficiencies in the storage system as well as in the storage array servicing the IO operations and responding to failovers.

Such drawbacks are advantageously overcome in illustrative embodiments herein by utilization of failover logic 114 to implement functionality for fast multipath failover as described above. For example, the disclosed techniques allow the MPIO drivers to take advantage of IO timeouts values that are less than the default OS IO timeout values during path failover in a multipath environment which increases the efficiency and speed of the storage system as a whole. It is to be appreciated that these and other features of illustrative embodiments are presented by way of example only and should not be construed as limiting in any way. Accordingly, different numbers, types and arrangements of system components such as host devices 102, SAN 104, storage array 105, storage devices 106, sets of IO queues 110, MPIO drivers 112, failover logic 114, controllers 124 and cache 126 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionalities within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise RAM, ROM, flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the failover logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers and additional or alternative components. Also, the particular configurations of system and device elements and associated processing operations illustratively shown in the drawings can be varied in other embodiments. For example, a wide variety of different MPIO driver configurations and storage array arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
    a host device comprising a processor coupled to memory, the host device being configured:
        to obtain a default timeout value of the host device for submission of an input-output operation to a storage system;
        to determine a first timeout value, the first timeout value being less than the default timeout value;
        to submit the input-output operation to the storage system along a first path using the first timeout value;
        to determine that the submission of the input-output operation along the first path has timed out based at least in part on the first timeout value;
        to determine a second timeout value, the second timeout value being greater than the first timeout value;
        to submit the input-output operation to the storage system along a second path using the second timeout value based at least in part on the determination that the submission of the input-output operation along the first path has timed out; and
        to resubmit the input-output operation to the storage system along the first path using the default timeout value based at least in part on a determination that the submission of the input-output operation along the first path and the second path have timed out;
        wherein at least one of determining a first timeout value and determining a second timeout value comprises selecting a number of attempts to submit the input-output operations along the respective first and second paths; and
        wherein the number of attempts is greater than one attempt.

2. The apparatus of claim 1 wherein the second timeout value and the default timeout value are the same.

3. The apparatus of claim 1 wherein the second timeout value is less than the default timeout value.

4. The apparatus of claim 3 wherein the host device is further configured:
    to determine that the submission of the input-output operation along the second path has timed out based at least in part on the second timeout value;
    to determine a third timeout value, the third timeout value being greater than the second timeout value; and
    to submit the input-output operation to the storage system along a third path using the third timeout value based at least in part on the determination that the submission of the input-output operation along the second path has timed out.

5. The apparatus of claim 4 wherein the third timeout value and the default timeout value are the same.

6. The apparatus of claim 1 wherein the default timeout value is specified by one of an operating system of the host device and a hardware bus adapter of the host device.

7. The apparatus of claim 1 wherein determining the first timeout value comprises determining the first timeout value based at least in part on one or more of a determined latency associated with the storage system, a prior number of attempts to submit the input-output operation to the storage system, a recent latency on one or more paths along which the input-output operation may be submitted to the storage system, a size of the input-output operation, one or more recent timeouts on the one or more paths along which the input-output operation may be submitted to the storage system and a number of alive paths along which the input-output operation may be submitted to the storage system.

8. The apparatus of claim 1 wherein the host device is further configured:
    to determine an indication of at least one of a storage device of the storage system to which the input-output operation is being submitted, a type of the storage device of the storage system to which the input-output operation is being submitted and an application requesting the submission of the input-output operation to the storage system; and
    to obtain a preset timeout value corresponding to the determined indication; and wherein determining first timeout value comprises determining the first timeout value as the obtained preset timeout value.

9. A method comprising:
obtaining a default timeout value of a host device for submission of an input-output operation to a storage system;
determining a first timeout value, the first timeout value being less than the default timeout value;
submitting the input-output operation to the storage system along a first path using the first timeout value;
determining that the submission of the input-output operation along the first path has timed out based at least in part on the first timeout value;
determining a second timeout value, the second timeout value being greater than the first timeout value;
submitting the input-output operation to the storage system along at least a second path using the second timeout value based at least in part on the determination that the submission of the input-output operation along the first path has timed out; and
resubmitting the input-output operation to the storage system along the first path using the default timeout value based at least in part on a determination that the submission of the input-output operation along the first path and the second path have timed out;
wherein at least one of determining a first timeout value and determining a second timeout value comprises selecting a number of attempts to submit the input-output operations along the respective first and second paths;
wherein the number of attempts is greater than one attempt; and
wherein the method is performed by at least one processor of a host device.

10. The method of claim 9 wherein the second timeout value and the default timeout value are the same.

11. The method of claim 9 wherein the second timeout value is less than the default timeout value.

12. The method of claim 11 wherein the method further comprises:
determining that the submission of the input-output operation along the second path has timed out based at least in part on the second timeout value;
determining a third timeout value, the third timeout value being greater than the second timeout value; and
submitting the input-output operation to the storage system using the third timeout value based at least in part on the determination that the submission of the input-output operation along the second path has timed out.

13. The method of claim 12 wherein the third timeout value and the default timeout value are the same.

14. The method of claim 9 wherein determining the first timeout value comprises determining the first timeout value based at least in part on one or more of a determined latency associated with the storage system, a prior number of attempts to submit the input-output operation to the storage system, a recent latency on one or more paths along which the input-output operation may be submitted to the storage system, a size of the input-output operation, one or more recent timeouts on the one or more paths along which the input-output operation may be submitted to the storage system and a number of alive paths along which the input-output operation may be submitted to the storage system.

15. The method of claim 9 wherein the method further comprises:
determining an indication of at least one of a storage device of the storage system to which the input-output operation is being submitted, a type of the storage device of the storage system to which the input-output operation is being submitted and an application requesting the submission of the input-output operation to the storage system; and
obtaining a preset timeout value corresponding to the determined indication; and
wherein determining first timeout value comprises determining the first timeout value as the obtained preset timeout value.

16. A computer program product comprising a non-transitory processor-readable storage medium having stored therein program code of one or more software programs, wherein the program code, when executed by at least one processor of a host device, causes the host device:
to obtain a default timeout value of the host device for submission of an input-output operation to a storage system;
to determine a first timeout value, the first timeout value being less than the default timeout value;
to submit the input-output operation to the storage system along a first path using the first timeout value;
to determine that the submission of the input-output operation along the first path has timed out based at least in part on the first timeout value;
to determine second timeout value, the second timeout value being greater than the first timeout value;
to submit the input-output operation to the storage system along a second path using the second timeout value based at least in part on the determination that the submission of the input-output operation along the first path has timed out; and
to resubmit the input-output operation to the storage system along the first path using the default timeout value based at least in part on a determination that the submission of the input-output operation along the first path and the second path have timed out;
wherein at least one of determining a first timeout value and determining a second timeout value comprises selecting a number of attempts to submit the input-output operations along the respective first and second paths; and
wherein the number of attempts is greater than one attempt.

17. The computer program product of claim 16 wherein the second timeout value and the default timeout value are the same.

18. The computer program product of claim 16
wherein the second timeout value is less than the default timeout value; and
wherein the host device is further configured:
to determine that the submission of the input-output operation along the second path has timed out based at least in part on the second timeout value;
to determine a third timeout value, the third timeout value being greater than the second timeout value; and
to submit the input-output operation to the storage system using the third timeout value based at least in part on the determination that the submission of the input-output operation along the second path has timed out.

19. The computer program product of claim 16 wherein the program code further causes the host device:
- to determine an indication of at least one of a storage device of the storage system to which the input-output operation is being submitted, a type of the storage device of the storage system to which the input-output operation is being submitted and an application requesting the submission of the input-output operation to the storage system; and
- to obtain a preset timeout value corresponding to the determined indication; and
- wherein determining first timeout value comprises determining the first timeout value as the obtained preset timeout value.

20. The apparatus of claim 4 wherein the host device is further configured:
- to submit the input-output operation to the storage system along the first path using the default timeout value based at least in part on the determination that the submission of the input-output operation along the third path has timed out.

\* \* \* \* \*